TYPEWRITER CONTROLLED RECORDING APPARATUS

Filed Jan. 3, 1968 7 Sheets-Sheet 1

Inventor:
Gerhard Ritzerfeld
By Michael S. Striker

Inventor:

June 2, 1970 G. RITZERFELD 3,515,338

TYPEWRITER CONTROLLED RECORDING APPARATUS

Filed Jan. 3, 1968 7 Sheets-Sheet 3

Inventor:

TYPEWRITER CONTROLLED RECORDING APPARATUS

Inventor:

Inventor:

Inventor:

June 2, 1970 G. RITZERFELD 3,515,338

TYPEWRITER CONTROLLED RECORDING APPARATUS

Filed Jan. 3, 1968 7 Sheets-Sheet 7

Inventor:

3,515,338
TYPEWRITER CONTROLLED RECORDING APPARATUS

Gerhard Ritzerfeld, Schorlemer Allee 14, Berlin 33, Dahlem, Germany

Filed Jan. 3, 1968, Ser. No. 695,445
Claims priority, application Germany, Jan. 6, 1967, R 44,999
Int. Cl. G06k *1/22, 19/06*
U.S. Cl. 234—18 16 Claims

ABSTRACT OF THE DISCLOSURE

Typewriter keys and a program means on the typewriter, control a plurality of setting magnets by which coupling bars, located between a reciprocating drive bar and a series of punches, are moved between inoperative and coupling positions so that recording areas of a line on a record carrier are punched in accordance with a code in fields of each recording area.

BACKGROUND OF THE INVENTION

The present invention relates to recording apparatus, such as a punching device, which is controlled by the keys of a typewriter on which simultaneously with the punching of the record carrier, a sheet is typed containing the same information as is recorded on the record carrier.

SUMMARY OF THE INVENTION

It is one object of the invention to improve typewriter controlled recording apparatus according to the prior art, and to provide a recording apparatus which within a very limited area of a record carrier card, produces a great number of recordings representing information.

Another object of the invention is to provide a typewriter controlled recording device capable of recording on a card having the same format as a copy sheet imprinted by the typewriter, so that the card can be stored together with the typed copy sheet.

Another object of the invention is to produce a printing form having a predetermined format, and a predetermined number of lines of a given length, by operation of a typewriter mechanism, and to simultaneously produce a record carrier having recordings representing the same information recorded in recording areas arranged in lines whose number and length corresponds to the number and length of lines of the printing form so that the printing form and the record carrier card can be stored together, and simultaneously used for printing the information on the printing form, and for reading out the information recorded on the record carrier card.

In accordance with the invention, a row of recording means, such as punches, is arranged in a direction transverse to the transporting movement of a record carrier and are selectively operated by a drive means when coupling means controlled by electromagnets are placed by the same in an operative coupling position. Preferably, the recordings are made in accordance with a code in a set of fields of each recording area. Each field is correlated with a recording element, a coupling means, and an electromagnet which sets the coupling means between an inoperative and coupling position.

In the preferred embodiment of the invention, the recording means are sets of punches, but visible marks may be recorded on the record carrier card, and read out by a photoelectric sensing means, when required.

The selection of the setting magnets by which the coupling means are moved between coupling and inoperative positions, is on one hand carried out depending on a program means mounted on the typewriter and having contact means respectively associated with the recording areas of a line of the record carrier card, and being rendered effective upon stepwise movement of the typewriter carriage. On the other hand, the setting magnets are controlled by the digit keys of the typewriter by which switches are operated which are connected by a circuit with the setting magnets, the circuit including switches, relays, and diodes so that the setting magnets respond in accordance with the selected code.

One embodiment of the invention comprises a row of recording means which are preferably sets of punches; transporting means for transporting a record carrier in a direction transverse to the row of recording means and punches between a plurality of recording positions in which successive rows of recording areas of the record carrier register with the row of recording means and punches, each punch registering with a field of a recording area; drive means, preferably including a reciprocating drive bar for actuating the punches of the recording means; a plurality of coupling means having a coupling position for coupling the recording means with the drive bar, and an inoperative position; setting means including a plurality of setting electromagnet means, preferably each including a set of setting magnets which are operatively connected with a set of coupling members of each coupling means for placing the same in the coupling or inoperative positions; a typewriter mechanism including keys and key switches; and circuit means for connecting the key switches with the setting electromagnetic means.

By actuation of selected keys and key switches, corresponding setting electromagnet means are energized and place selected coupling means in the coupling position so that the respective recording punches are actuated by the drive means through the coupling means, and information is recorded in the recording areas of the record carrier, preferably in coded form by punched holes in a set of fields of each recording area.

The typewriter mechanism comprises a movable carriage and a program means having a plurality of program contact means respectively correlated with the recording areas of each row of the record carrier. The program contacts are connected in the circuit of the setting electromagnet means and are successively rendered operative upon stepwise movement of the typewriter carriage following each key actuation. In this manner, information represented by successively operated selected keys is recorded in successive recording areas of the same row of recording areas of the record carrier.

Preferably, each recording means includes a set of recording elements, such as punches, each coupling means includes a set of coupling elements, such as pivotally mounted coupling bars, and each setting electromagnet means includes a set of magnet elements. The elements of the sets are respectively correlated and associated with code elements for representing in coded form digital values represented by the keys.

In one embodiment of the invention, coupling bars are mounted for longitudinal movement between the inoperative and coupling position, and are turned about a pivot by the drive means for actuating corresponding punches when set by the setting magnets to assume the coupling position. The setting magnets have arresting armature members holding the coupling bars against the action of biasing means, and releasing the coupling bars for movement to the coupling position, when energized under the control of the keys of the typewriter.

In another embodiment of the invention, the coupling means include pivotally mounted, spring biased arresting members articulated to coupling members. When a setting magnet releases an arresting member, the respective coupling member is moved to a coupling position located between the drive means and the respective punch means.

For each set of coupling bars, a mechanical or electromagnetic clearing means is advantageously provided which is operated before the punching stroke.

The drive means operate a return means for returning all coupling means to the initial position after the punching of the record carrier card has been carried out. The return means preferably include cams and cam followers operated by the drive motor which also operates a reciprocating drive member for the coupling means, preferably through a one revolution clutch.

Control means are preferably provided which include switches operated by the coupling means in the coupling position which, by means of a control relay, return in decoded form the values required for representing a digit to a locking means for the keyboard of the typewriter so that the keyboard is locked when the magnets required for representing the respective digit have not been energized, or respectively if the corresponding coupling means have not been placed in the coupling position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
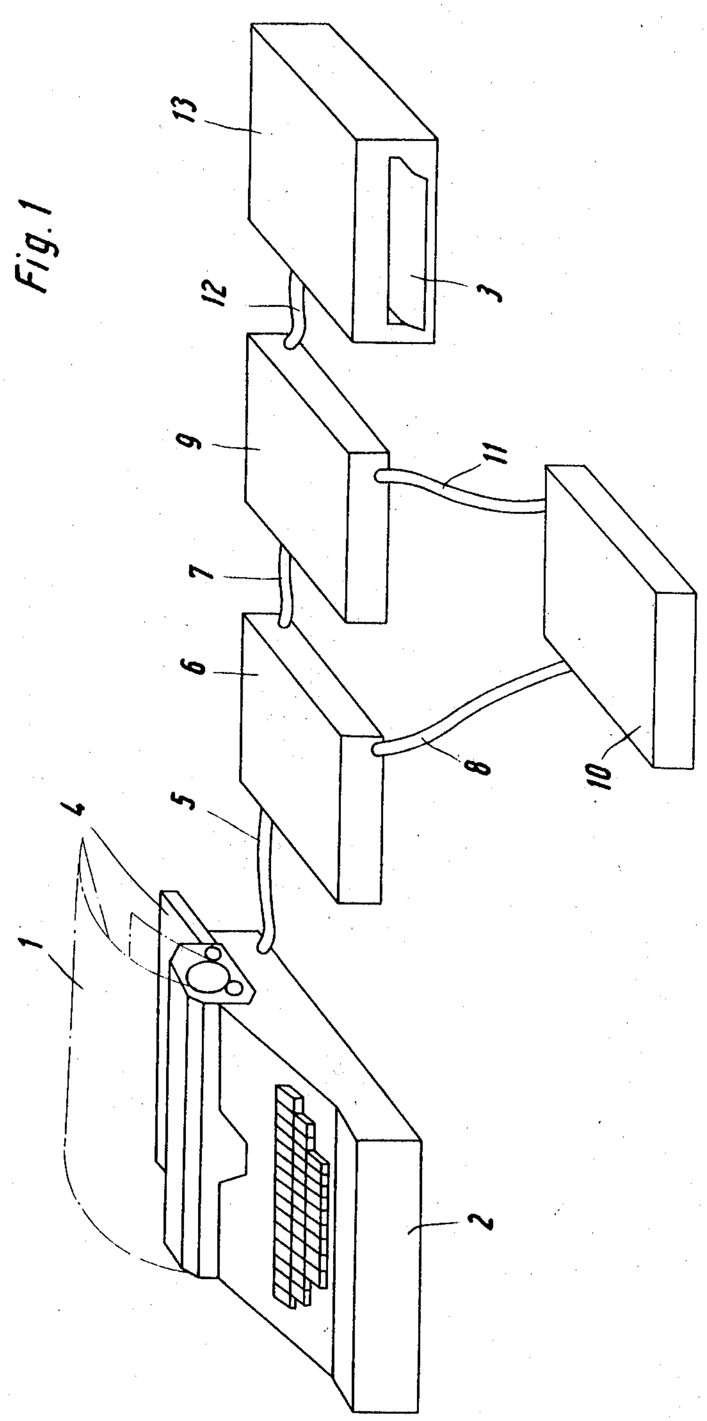
FIG. 1 is a perspective schematic view illustrating the principle of the operation of the apparatus of the invention.
Figure 2:
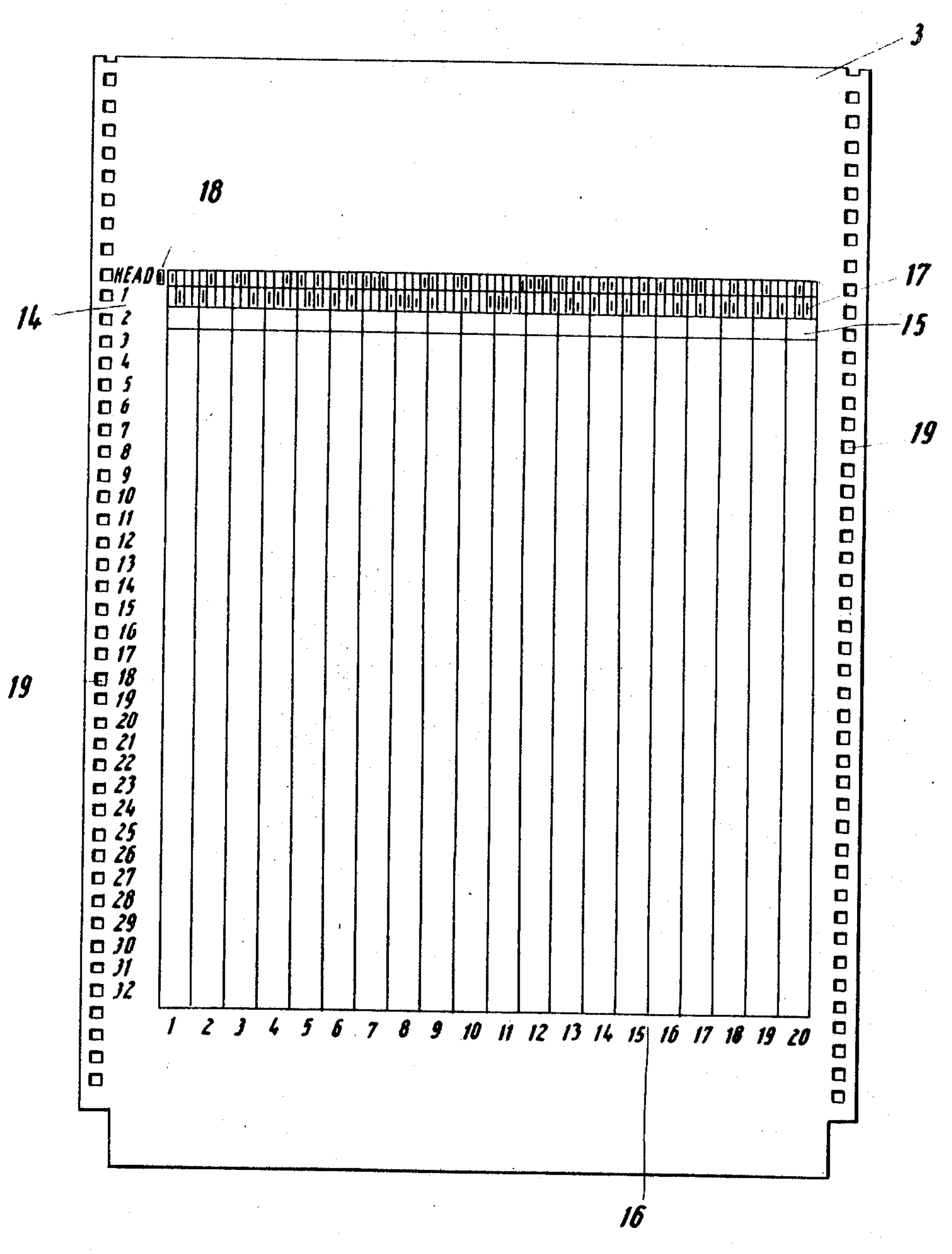
FIG. 2 is a view illustrating a record carrier card used in the apparatus of the invention.
Figure 6:
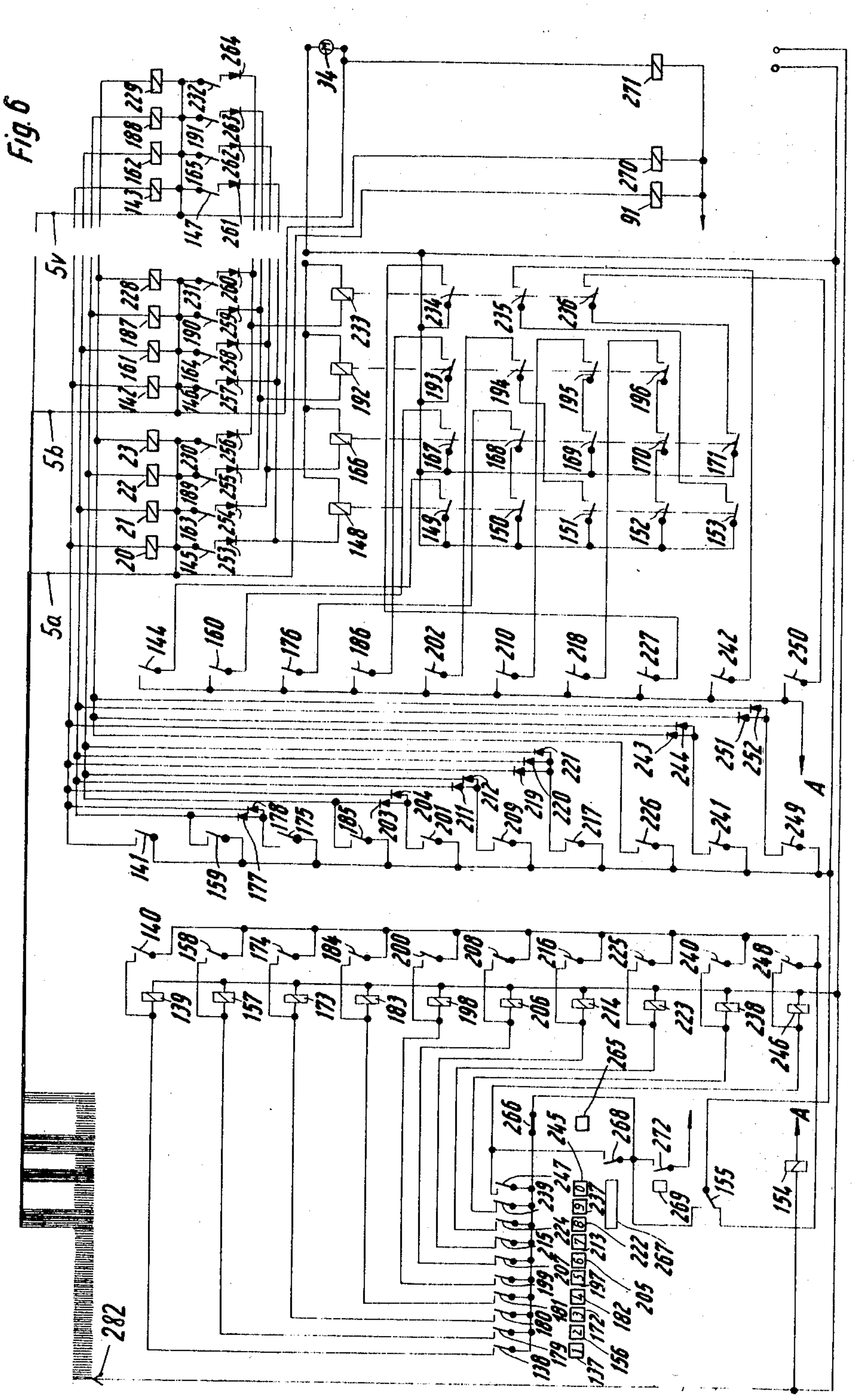
FIG. 6 is a diagram illustrating the electric circuit of the embodiment of FIGS. 3 and 4, and including circuit parts constituting a coding device.

FIG. 1 illustrates in a schematic and simplified manner a typewriter controlled recording apparatus according to the invention. A typewriter 2 has a keyboard **2*a* including ten digit keys by which key switches, see FIG. 6, are operated. A paper carriage 2*b* is mounted on the typewriter frame and moves stepwise upon actuation of each key due to the action of an escapement mechanism, not shown. A printing form 1 is impressed along lines when the keys are operated, and as the carriage 2*b* moves stepwise after each typing of a digit, a contact means of a program plate means 4 is rendered operative. The information printed on the printing form 3 is transferred under the control of the program plate means 4 through the cable 5 into a coding device 6, which is illustrated in detail in FIG. 6. The coded information is supplied through cables 7 and 8 to the storing device 9 and to a testing device 10 connected by a cable 11 to the storing device 9. Storing device 9 is combined with a recording device 13, such as a punching device and connected with the same by conductors forming a cable 12. Punching device 13 punches the record carrier card 3 which is shown in FIG. 2. If the information typed by the typewriter 2 conforms with the information introduced into the storing device 9, the punching device or other recording device 13** is operated. The circuit connecting the several devices will be described in detail with reference to FIG. 6.

FIG. 2 illustrates a record carrier 3 in the form of a card having preferably the DIN A 4 format. A column 14 includes the legend "head" and the numbers from 1 to 32 to identify a "head" line, and thirty-two other lines respectively associated with a heading typed by the typewriter 2 and with thirty-two text lines typed by the same. Each line of the record carrier 3 has twenty recording areas 15, identified by the numbers in the line 16, and each recording area is divided into four fields in which punched holes 17 are selectively made to represent the digits by different combinations of holes 17 punched into the four fields of a recording area 15. A control field 18 can also be provided with the punched holes for a purpose which will be explained hereinafter. Lateral rows of square transporting holes 19 are provided for engagement with transporting sprockets.

Figure 3:
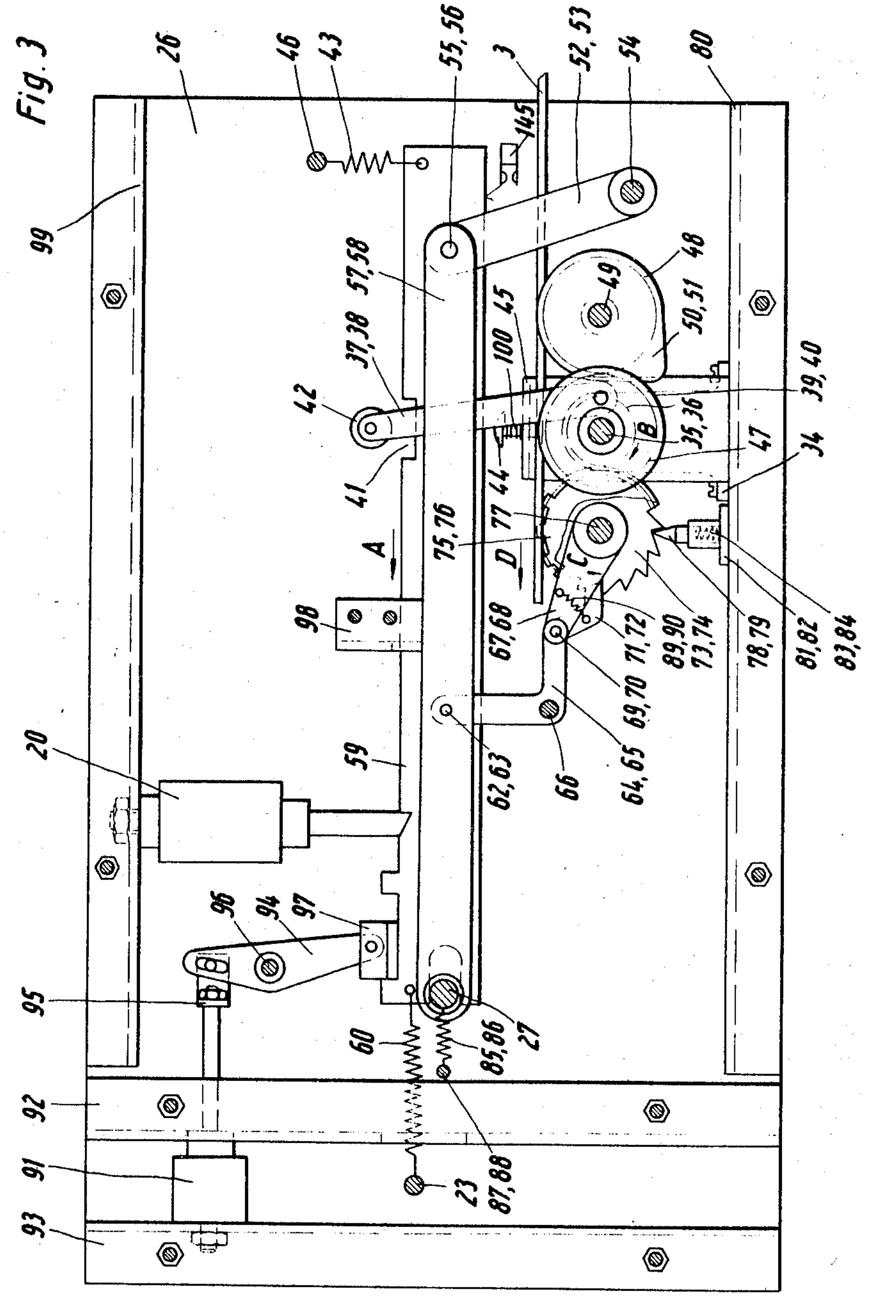
FIG. 3 is a fragmentary side view, partially in vertical section, illustrating the storing and punching device according to one embodiment of the invention.
Figure 4:
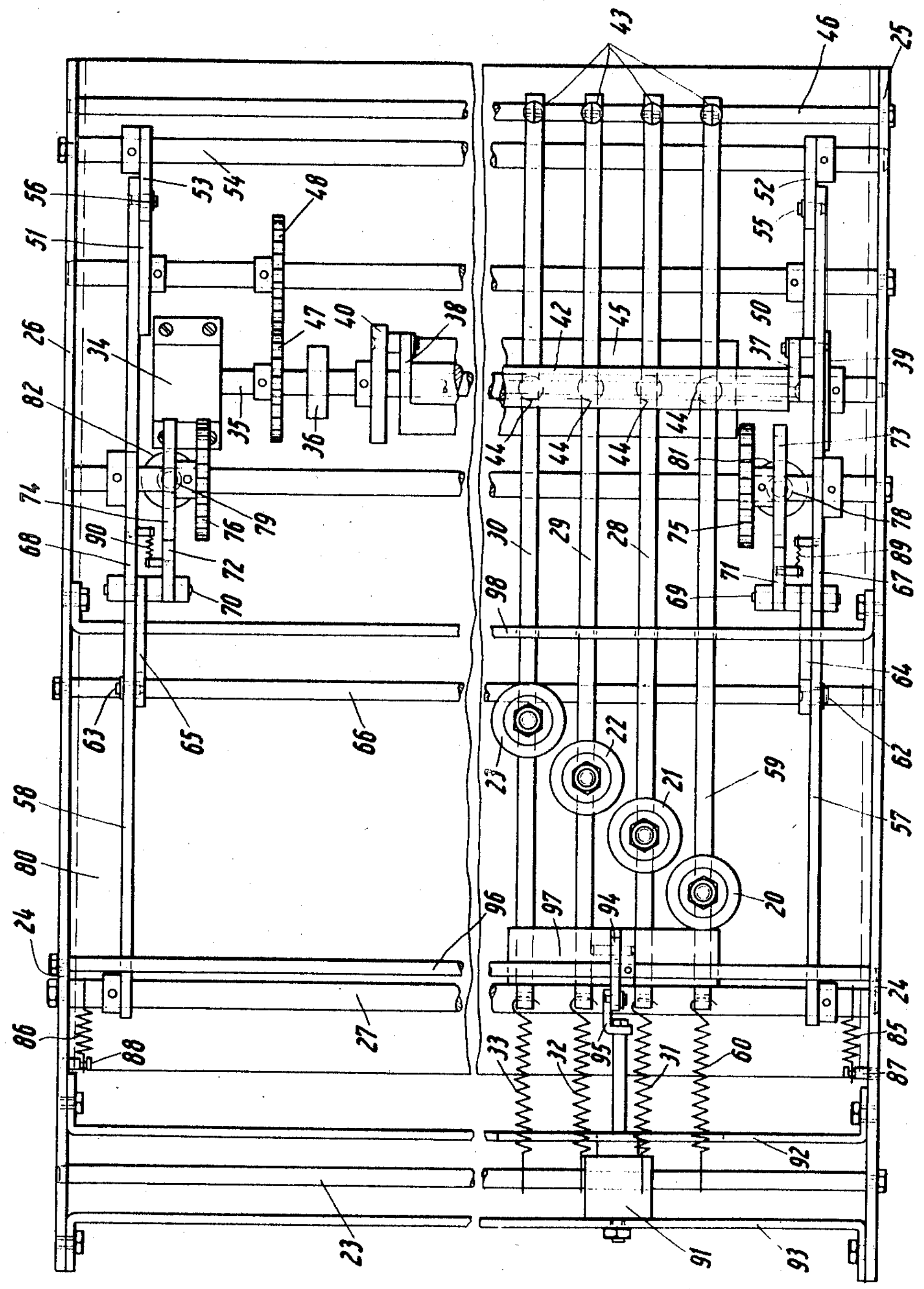
FIG. 4 is a fragmentary schematic plan view of the embodiment of FIG. 3.

FIGS. 3 and 4 illustrate a combined storing and punching device by which recordings in the form of punched holes 17 are made in the record carrier 3 shown in FIG. 2. When values are introduced by the keys of the typewriter 2 into the coding device shown in FIG. 1, which will be explained in greater detail with reference to FIG. 6 hereinafter, one, two, or three of a series of four setting electromagnets 20, 21, 22, 23, which together constitute a setting electromagnetic means, are energized for representing in coded form values expressed by four code elements in the form of holes 17 punched into the four fields of a recording area 15 of a record carrier 3, or by corresponding markings which can be optically read out. Eighty electromagnets respectively associated with the eighty fields of the twenty recording areas 15 of each line of the record carrier are provided arranged in a row, but it is assumed that only electromagnet 20 is energized so that the armature of electromagnet 20 is actuated and retracts a catch portion from a notch in a coupling bar 59 so that spring 60, which is secured to a fixed transverse shaft **23*a*, moves coupling bar 59 in direction of the arrow A until coupling bar 59 abuts in a coupling position the shaft 27 which is mounted in elongated slots 24 in lateral walls 25 and 26**.

Electromagnets 21, 22, and 23 cooperate in the same manner with coupling bars 28, 29, and 30, and with springs 31, 32 and 33. The group of four electromagnets 20, 21, and 23 cooperates with the four fields of a recording area 15 of the record carrier 3 and are operable to release the coupling bars for movement from the illustrated inoperative position by the action of springs 60, 31, 32, 33 to a coupling position in which cutout 41 is not located under a drive bar 42. However, in a modified construction, the four coupling bars have a normal coupling position. When these coupling bars are released by the arresting portions of energized electromagnets, they are pulled by springs to inoperative positions.

When all coupling bars 59, 28, 29, 30 have assumed positions corresponding to the "head" information which is to be entered into a recording area 15 of the "head" line of record carrier 3, or corresponding to information which is to be entered into one of the lines 1–32 of recording areas 15, a motor 34 is started in a manner which will be explained with reference to FIG. 6 hereinafter. Shaft 35 is driven by motor 34 under the control of a contact means 36 and rotates in the direction of the arrow B. In a modified arrangement, shaft 35 is driven by a continuously running motor by means of a one-revolution clutch. Discs 39 and 40 on shaft 35 are pivotally connected with connecting rods 37 and 38 which are connected to the ends of a drive bar 42 so that the same is reciprocated toward and away from the coupling bars. If a cutout 41 of any punch bar is located under the drive bar, the punch bar is not engaged or operated by the drive bar, but when a selected coupling bar has been shifted to the coupling position by the respective spring upon release by the corresponding electromagnet, drive bar 42 engages the upper edge of the respective coupling bar, of for example coupling bar 59 and turns the same, against the action of a spring 43 secured to a stationary shaft 46, about shaft 27 so that the respective coupling bar engages a recording element in the form of a punch 44 which is depressed against the action of a spring 100 and punches a hole in the respective field of a recording area 15 of record carrier 3. After half a revolution of shaft 35, drive bar 42 is again moved upward to the higher inoperative position shown in FIG. 3.

Gears 47 and 48 drive a shaft 49 from motor shaft 35 so that cams 50 and 51 are rotated. After a punch 44 has punched a hole, cams 50 and 51 are operative to turn a pair of cam follower levers 52, 53 about shaft 54 so that a pair of links 57, 58, connected with levers 52, 53 by pins 55, 56 and carrying shaft 27, move opposite to the direction of arrow A, so that shaft 27 returns previously selected and displaced coupling bars to the initial position shown in FIG. 3 in which the arresting armature portions of the electromagnets 20–23 engage the corresponding notches of the punch bars 59 and drive bar 42 is located above cutout 41. Angular levers 64, 65 are respectively articulated to links 57, 58 by pivots 62, 63 and are turnable about a shaft 66 so as to turn arms 67, 68 in the direction of the arrow C. Pawls 71 and 72 are connected by pivots 69, 70 with angular levers 64, 65 and with arms 67, 68 and cooperate with ratchet wheels 73, 74 which are fixed to shaft 77 so that the action of pawls 71, 72 turns ratchet wheels 73 and 74, and also transporting wheels 75, 76 which are secured to shaft 77, in the direction of the arrow C until the arresting members 78, 79 snap into the next-following notch of the respective ratchet wheel 73, 74. Arresting members 78, 79 are pointed pins guided in guide members 81, 82 which are secured to the base plate 80 and house springs 83 and 84 are biassing the arresting members 78, 79 into engagement with the ratchet wheels 73, 74 respectively.

When ratchet wheels 73, 74 are turned in this manner by the force supplied by the cams 50, 51, shaft 77 turns with transporting wheels 75, 76 which have sprocket teeth engaging the square transporting holes 19 along the edges of record carrier 3, see also FIG. 2. Transporting wheels 75, 76 transport the record carrier in the direction of the arrow D one step so that the next-following line of recording areas 15 is located under the row of punches 44.

After one revolution of motor shaft 35, shaft 27 is returned by springs 85 and 86, which are secured to fixed pins 87, 88 so that shaft 27 assumes again the position shown in FIG. 4, while pawls 71, 72 which are biased by springs 89, 90 are returned to the position shown in FIG. 3 abutting notches of the ratchet wheels 73, 74.

The control hole in the special control field 18 of record carrier 3, see FIG. 2, is required for reading out record carrier 3 by other apparatus, and may be manually punched. The control hole in field 18 may also be used for inserting record carrier 3 into the coding and punching device shown in FIGS. 3 and 4. This requires an additional transporting tooth or lug provided in a lateral position on transporting wheel 71 which, in the position of rest shown in FIG. 3, is located directly vertically above shaft 77. If this lug is provided, the "head" line of recording areas 15 of record carrier 3 can be immediately punched during the first revolution of motor shaft 35.

In the event that due to an error, a wrong electromagnet 20 was energized and a wrong coupling bar 59 released, a correcting magnet 91 is energized, twenty correcting magnets 91 being mounted between parallel walls 92 and 93. Upon energization of a correcting magnet 91, a link connected with the armature thereof, turns a lever 94 about shaft 96 so that a slide block 97 is operated to return erroneously released coupling bars opposite to the direction of the arrow A until the notches therein are again engaged by the arresting armature members of the respective setting electromagnets. All coupling bars are guided in holes of a transverse guide member 98 which is secured to the lateral walls 26 and 25. The purpose of switch 145, which cooperates with each coupling bar 59, will be explained with reference to FIG. 6 which is a diagram illuustrating the circuit of the combined storing and recording device illustrated in FIGS. 3 and 4.

Figure 6A:
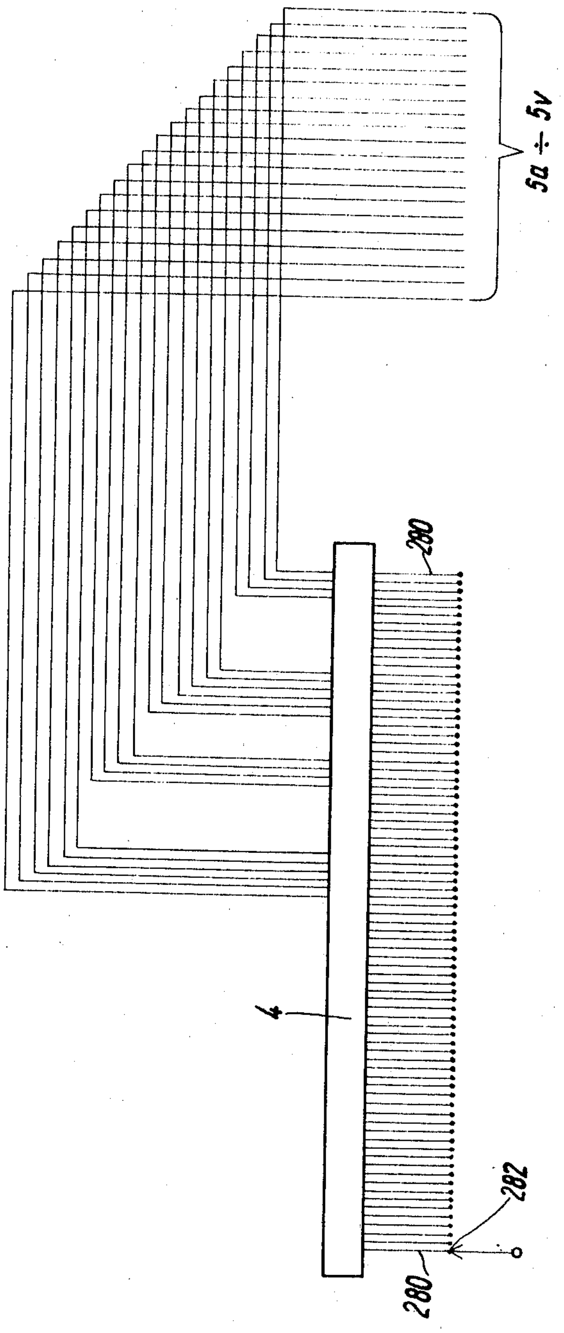
FIG. 6*a* is a fragmentary schematic wiring diagram illustrating details of control circuits of the program means illustrated by FIG. 6.

Referring now to the coding device shown in FIG. 6*a* and FIG. 6, upon actuation of a pushbutton or key 137 of keyboard 2*a*, representing the digit one, switches 138, 144 are closed so that relay 139 is energized and closes contacts 140, 141, whereby relay 139 is held in energized condition. Depending on the position of the carriage of the typewriter, see FIG. 1, relative to the program means 4 which has 20 contact means correlated with the 20 recording areas 15 of each line of recording areas, either electromagnet 20 associated with the first recording area 15 of a line, or electromagnet 142, associated with second recording area 15, or one of the following, not-illustrated electromagnets associated with other recording areas 15 of the same line, or the electromagnet 143 associated with the twentieth recording area 15 of the respective line, or no electromagnet at all is energized.

FIG. 6*a* illustrates a program means 4, which includes current inputs 280 and current outputs 5*a* to 5*v*. The slide contact 282 is connected with the typewriter carriage 26 of the typewriter 2, see FIG. 1, and is moved stepwise with the typewriter carriage by actuating the type bar. When slide contact 282 is brought into contact with one of the current inputs 280, which are connected with one of the current outputs 5*a* to 5*v*, see FIG. 6, by means of the program plate 4, the selected number typed by the typing means is then written on the printing form 1, see FIG. 1, and simultaneously one or more of the electromagnets 20, 21, 22, 23, 142, 161 (and so forth) are energized for recording the selected number on the record carrier 3.

If one of the electromagnets 20, 142 or 143, see FIG. 6, is energized, the respective coupling bar 21 is released for movement so that switch 145, or corresponding switches 146 or 147 are closed. Relay 148 is energized and closes contacts 149, 150, 151, 152, and 153. The closed contacts 149 and 144 complete the circuit of the locking magnet 154 which releases a locking means, not shown, permitting the operation of the typewriter keys of typewriter 2 shown in FIG. 1. At the same time, switch 155 is shifted so that relays 139 and 148 are de-energized and the respective correlated contacts of relays 139, 148 open again.

Actuation of key 156, associated with the digit two, closes switch 179 so that the relay 157 is energized and closes contacts 158, 159 and 160 whereby one of the electromagnets which are not illustrated, or electromagnet 21, 161, 162 is energized. One of the switches 163, 164, 165 is thus closed so that relay 166 closes contacts 167, 168, 169, 170 and 171. The closed contacts 167 and 160 complete the circuit of electromagnet 154.

When key 172, associated with the digit 3, is operated, switch 180 is closed and relay 173 is energized so that contacts 174, 175 and 176 close. The diodes 177 and 178 become conductive and electromagnets 20 and 21, or 142 and 161 (and so forth) are energized whereupon, for example, switches 145 and 163 are closed. Relays 148 and 166 are energized so that contacts 150, 168, 176 are closed and electromagnet 154 is energized.

When key 182, associated with the digit 4, is operated, relay 183 is energized through the closed contact 181, and contacts 184, 185, 186 close. Magnets 22, 187 or 188 are energized, switch 189, 190 or 191 is closed, relay 192 is energized, and contacts 193, 194, 195 and 196 are closed so that the electromagnet 154 is energized through the closed contacts 193 and 186.

When key 197, associated with the digit 5, is operated, relay 198 is energized through the closed switch 199, and closes contacts 200, 201 and 202. Magnets 20 and 22 are energized through diodes 203 and 204, switches 145 and 189 close, and relays 148 and 192 are energized. The closed contacts 151, 194 and 202 energize electromagnet 154.

When key 205, associated with the digit 6, is operated, relay 206 is energized through switch 207, and contacts 208, 209 and 210 close. Electromagnets 21 and 22 are energized through diodes 211 and 212, switches 163 and 189 close, and relays 166 and 192 are thus energized. Contacts 195, 169 and 210 are closed and effect energization of electromagnet 154.

When key 213, associated with the digit 7, is operated, relay 214 is energized through the closed switch 215 and contacts 216, 217 and 218 close. The diodes 219, 220 and 221 energize the electromagnets 20, 21 and 22 so that switches 145, 163 and 189 close and relays 148, 166 and 192 are energized. Contacts 196, 170, 152 and 218 and electromagnet 154 is energized.

When key 222, associated with the digit 8, is operated, relay 223 is energized by the closed switch 224 and closes contacts 225, 226 and 227 so that electromagnet 23, 228 or 229 is energized, switches 230, 231 or 232 are closed and relay 235 is energized. Contacts 234, 235 and 236 close, and the closed contacts 234 and 227 complete the circuit of electromagnet 154 which is energized.

Upon actuation of key 237, associated with the digit 9, relay 238 is energized by the closed switch 239, and contacts 240, 241 and 244 are closed. Electromagnets 20 and 23, for example, are energized through the diodes 243 and 244, switches 145 and 230 close, and relays 148 and 233 are energized. The closed contacts 235, 153 and 242 effect energization of electromagnet 154.

Upon actuation of key 245, which is associated with the digit 0, relay 246 is energized through the closed switch 247, and closes contacts 248, 249 and 250. Electromagnets 21 and 23 are energized by the diodes 251 and 252, switches 163 and 230 are closed, and relays 166 and 233 are energized. Electromagnet 154 is energized through the closed contacts 236, 171 and 250.

The diodes 253 to 264 are provided to assure that upon energization of one or several of the electromagnets 20, 21 and so forth, only the electromagnets of the recording area 15 selected in accordance with the program on the program means 4 are energized. In each successive position of the paper carriage of the typewriter, successive contact means of program plate means 4 are operative to cause punching of recording areas 15 of a line on the record carrier 3 with coded holes representing the digits selected by operating keys.

In the event that the upper case characters on the typewriter keys of typewriter 2 are also to be written, the shift key 265 is operated so that switch 266 opens, interrupting the circuit of the switches associated with the keys. When the space bar 267 is operated, switch 268 is closed and an impulse passes through the closed contact 155 for initiating the punching of the value zero which otherwise, as explained above, is effected by operation of the key 245.

If one of the keys 137, 156 (and so forth) is erroneously operated and the mistake immediately noticed, a backspacing key 269 is operated for energizing one of the correcting magnets 91, 270 or 271 (and so forth) through the closed switch 272 which is controlled by the program member 4 shown in FIG. 1, and carries out the clearing or correcting operation described with reference to FIGS. 3 and 4 in which a lever 94 and slide 97 return the coupling bar to its initial position. At the same time, the paper carriage of the typewriter has performed a step opposite to the writing direction so that a new value can be introduced by operating a key.

During the setting of the coupling bars of the last recording area 15 of a line, see FIG. 2, by means of electromagnets 143, 162 (and so forth), either motor 34 described with reference to FIGS. 3 and 4 is started, or in a modified arrangement, a one-revolution clutch, not shown, is released to permit the actuation of the coupling bars by drive bar 42 and the return of the coupling bars by shaft 27 under the control of cams 50, 51.

Figure 5:
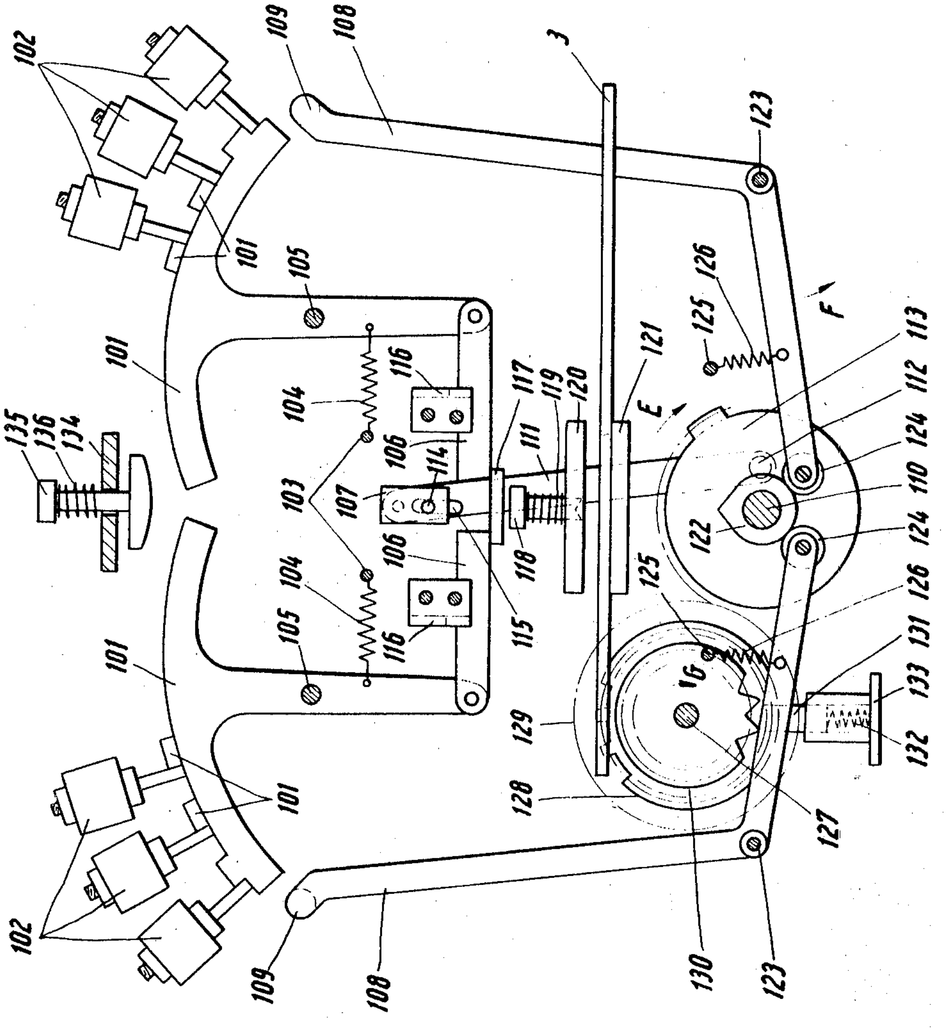
FIG. 5 is a fragmentary schematic side view of a storing and punching apparatus according to another embodiment of the invention.

FIG. 5 illustrates a modified arrangement of a combined storage and punching device. Two rows of 40 coupling means 101, 106 are provided, each including an arresting member 101 having a lever portion mounted on shafts 105 for angular movement and a segment shaped arresting portion which cooperates with an electromagnet 102 by means of staggered projections. Each two of the staggered opposite coupling means 101, 106 are associated with a recording area 15 of the lines of the record carrier 3 shown in FIG. 2. If in accordance with a value typed on the typewriter 2, two electromagnets 102 are energized, whose armatures release the two respective correlated arresting portions, for example, of the two arresting members 101 located in front in the illustration of FIG. 5, the coupling members 106 assume a coupling position. The arresting members are biased by springs 104 secured to stationary pins 103 so that the released arresting member 101 turns about shaft 105 and pushes coupling members 106 so far under a drive member 107 that the ends of the respective arresting members 101 abut shafts 109 of return levers 108 which are mounted for pivotal movement about shafts 123. When all coupling means 101, 106 are set in accordance with the program by electromagnets 102, shaft 110 is driven by a motor, not shown, by a one-revolution clutch, not shown, to perform one revolution. Connecting rod 111 which is connected by pivot 112 with the gear segment 113 turning in the direction of the arrow E, actuates drive member 107 which is mounted by means of a shaft 114 in elongated slots 115 so that drive member 107 moves downwards and engages the inwardly advanced coupling members 106 which are guided by guide means 116 and push the punch plate 117 downward into engagement with respective punch 118 which is moved downward against the action of a spring 119 to pass through the gap between plates 120, 121 between which record carrier 3 is located so that the same is punched.

After the punching operation has been completed, a cam 122 secured to shaft 110 operates the angular return levers 108 against the action of springs 126 which are secured at 125 by engaging rollers 124 at the ends of return levers 108. Return levers 108 turn in direction of the arrow F and return shafts 109 at the ends of return levers 108 push segments 101 to the initial position.

The gear segment 113 cooperates after the punching operation with a gear 129 which is secured to shaft 127 and turns transporting wheels 128 which are fixed on shaft 127 so that record carrier 3 is transported to a position in which the next line of recording areas 15 is located under the row of punches 118. An arresting member 131 is biased by a spring located in a guide member 133 to snap into a notch of an arresting wheel 130 secured to shaft 127 after the same has turned one step in the direction of the arrow G so that the position of the record carrier 3 is exactly determined in relation to the row of punches 118.

If a typewriter key is erroneously operated and the error noticed, a correcting member 135 is moved along a guide plate 134 parallel to the rows of arresting members 101 until it is located opposite the erroneously released coupling means 101, 106, whereupon the correcting member 135 is manually actuated against the action of a spring 136 to push the erroneously actuated coupling means 101, 106 back to the initial position shown in FIG. 5 against the action of springs 104 so that another value can be introduced.

It will be understood that each of the elements described above, or two or more together, may also find a useful application in other types of typewriter controlled recording apparatus differing from the types described above.

While the invention has been illustrated and described as embodied in a combined punching device for punching a great number of holes into a punch card of small size, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Typewriter controlled recording apparatus comprising, in combination, a row of recording means; transporting means for transporting a record carrier having a plurality of rows of recording areas, which are parallel with said row of recording means, in a direction transverse to said row of recording means between a plurality of recording positions in which successive rows of recording areas register with said row of recording means, and each recording means registers with a recording area of the registering row of recording areas; common drive means for said row of recording means; a row of coupling means respectively correlated with said recording means of said row of recording means and having coupling positions connecting the correlated recording means with said drive means, and inoperative positions; a plurality of setting means operatively connected with said coupling means, respectively, for placing the same in said operative and inoperative positions; a typewriter mechanism including a plurality of keys and key switches, a carriage stepwise movable upon actuation of each key between carriage positions correlated with the recording means of said row of recording means, respectively, printing means for printing a line of imprints upon successive actuations of said keys, and program means including a plurality of program contact means correlated with the recording means of said row of recording means, respectively, and successively actuated by said carriage upon successive steps of the same; circuit means connecting said key switches and said program contact means with said setting means so that upon successive actuation of selected keys, the coupling means correlated with the recording means correlated with the respective carriage positions are placed by the respective setting means in said coupling position for representing the information of the respective key; means for actuating said common drive means when the setting of said coupling means for said row of recording means and the printing of said line have been completed whereby all recording means whose correlated coupling means are in said coupling positions are simultaneously actuated by said drive means to record on the correlated recording areas of said registering row of recording areas; and means connecting said drive means with said transporting means for actuating the same to transport said record carrier to the next recording position.

2. Recording apparatus as claimed in claim 1 wherein each setting means includes a setting electromagnet means operatively connected with the respective correlated coupling means for placing the same in said coupling and inoperative positions; and wherein said circuit means connect said key switches with said setting electromagnetic means.

3. Typewriter controlled recording apparatus, comprising, in combination, a row of recording means; transporting means for transporting a record carrier in a direction transverse to said row of recording means between a plurality of recording positions in which successive rows of recording areas of said record carrier register with said row of recording means, and each recording means registers with a recording area of said record carrier; drive means for said recording means; a plurality of coupling means, each having a coupling position for coupling said recording means, respectively, with said drive means so that recording means whose correlated coupling means are in said coupling position are actuated by said drive means to record on correlated recording areas of said record carrier, and an inoperative position in which said recording means are not actuated by said drive means; setting means including a plurality of setting electromagnet means operatively connected with said coupling means, respectively, for placing the same in said coupling and inoperative positions; a typewriter mechanism including keys and key switches, and locking means for locking said keys; and circuit means for connecting said key switches with said setting electromagnet means for causing energization of selected setting electromagnet means upon actuation of correlated selected keys, and thereby operation of the correlated coupling means so that information represented by selected actuated keys is recorded in the recording areas of said record carrier when said drive means drive recording means whose correlated coupling means are in said coupling position, said circuit means including control switches respectively operated by said coupling means in one of said positions of the same, and control relays controlled by said control switches, said control relays controlling said locking means to lock those keys whose correlated setting electromagnet means have not been energized.

4. Recording apparatus as claimed in claim 3 wherein each recording means includes a set of recording elements; wherein each coupling means includes a set of coupling elements; wherein each setting electromagnet means includes a set of magnet elements, said elements of said sets being respectively correlated and associated with code elements for representing in coded form digital values represented by said keys; and wherein said circuit means include circuit elements for energizing selected magnet elements of each setting electromagnet means upon actuation of a key switch by the respective key.

5. Recording apparatus as claimed in claim 4 wherein said circuit elements include relay means, contact means operated by said relay means, and diode means.

6. Recording apparatus as claimed in claim 2 wherein each of said coupling means includes at least one coupling bar located between said drive means and the respective recording means; and comprising means for supporting each coupling bar for turning movement by said drive means for actuation of the respective recording means, and for longitudinal movement between said coupling position in which said coupling bar is engaged by said drive means; wherein said setting means include a biassing means for urging each coupling bar to one of said positions thereof; and wherein each setting electromagnetic means has an armature member for arresting the respective coupling bar in the other of said positions thereof so that upon energization of each said setting electromagnetic means, the respective coupling bar is released for movement by said biassing means to said one position.

7. Recording apparatus as claimed in claim 6 wherein said one position of said coupling bars is said inoperative position and said other position is said coupling position.

8. Recording apparatus as claimed in claim 6 wherein said drive means include a drive bar crossing said coupling bars and reciprocating toward and away from the same; and wherein each coupling bar has a recess registering in said inoperative position with said drive bar so that the same does not drive said coupling bar toward said recording means.

9. Recording apparatus as claimed in claim 6 comprising cam means driven from said drive means, cam follower means, and a means driven by said cam follower means for returning said coupling bars against the action of said biassing means to said other position after said drive means has operated said coupling means in said coupling position to actuate said recording means.

10. Recording apparatus as claimed in claim 6 wherein each of said coupling means includes an arresting member and a coupling member articulated to said arresting member; and comprising means for guiding each coupling member, and for supporting each arresting member for pivotal movement with said coupling member about a pivot axis between said inoperative position and said coupling position, said coupling member being located between said drive means and said recording means in said coupling position and engaged by said drive means in said coupling position for operating said recording means; wherein said setting means include biassing means for urging said coupling means to said coupling position; and wherein each setting electromagnet means has an armature member for engaging and arresting said arresting member in said inoperative position so that upon energization of said setting electromagnet means said coupling means is released for movement to said coupling position.

11. Recording apparatus as claimed in claim 10 wherein said coupling member has a curved segment shaped portion concentric with said pivot axis, and a pivotally supported lever portion carrying said segment shaped portion at one end, and being articulated to said coupling member at the other end.

12. Recording apparatus as claimed in claim 11 comprising cam means driven from said drive means and cam follower means cooperating with said segment shaped portions for returning said coupling means to said inoperative position after said drive means has operated said coupling means in said coupling position to actuate said recording means.

13. Recording apparatus as claimed in claim 2 wherein said setting means include biassing means for urging said coupling means into one of said positions thereof; and wherein each of said setting electromagnet means has an armature member for arresting the respective coupling means in the other position thereof so that upon energization of said setting electromagnet means, the respective coupling means is released for movement by said biassing means to said one position.

14. Recording apparatus as claimed in claim 13 comprising return means driven by said drive means for returning said coupling means from said one position to said other position after said drive means has actuated said coupling means in said coupling position to actuate said recording means.

15. Recording apparatus as claimed in claim 14 wherein said return means include cam means driven from said drive means, and cam follower means connected with said coupling means; and comprising a toothed wheel and an arresting pawl connected with said coupling means for arresting the same in each of said positions of the same.

16. Recording apparatus as claimed in claim 15 wherein said drive means included a reciprocable drive member for said coupling means and recording means; and wherein said return means include a one revolution clutch driven from said drive mean for first moving said drive member in a drive stroke, and for then turning said cam means to a position for returning said coupling means to said other position.

References Cited

UNITED STATES PATENTS

| | | | |
|---|---|---|---|
| 1,780,610 | 11/1930 | Weinlich | 234—115 X |
| 1,800,596 | 4/1931 | Bryce | 234—115 X |
| 3,091,387 | 5/1963 | Locke | 234—124 X |
| 3,353,744 | 11/1967 | Becking et al. | 234—124 X |
| 1,823,550 | 9/1931 | Kurowski | 234—90 X |
| 1,868,111 | 7/1932 | Lasker | 234—91 X |

WILLIAM S. LAWSON, Primary Examiner

U.S. Cl. X.R.

197—1.6; 234—36, 91, 115, 124